E. H. SNYDER.
LIFTING DEVICE FOR PLANTERS.
APPLICATION FILED MAR. 6, 1916.

1,352,634.

Patented Sept. 14, 1920.

Inventor:
E. H. Snyder.
By
atty.

UNITED STATES PATENT OFFICE.

EMMANUELL HENRY SNYDER, OF DAVENPORT, IOWA.

LIFTING DEVICE FOR PLANTERS.

1,352,634.   Specification of Letters Patent.   Patented Sept. 14, 1920.

Application filed March 6, 1916. Serial No. 82,401.

*To all whom it may concern:*

Be it known that I, EMMANUELL HENRY SNYDER, a citizen of the United States, residing at Davenport, in the county of Scott, in the State of Iowa, have invented a new and useful Lifting Device for Planters, of which the following is a specification.

My invention relates to improvements in a lifting device for seed planting machines which are adapted to planting seed in rows, and in hills or drills; and the objects of my improvements are:

First, to provide a means of regulating the depth at which seed may be deposited in the ground, in planting.

Second, to provide, in corn and other seed planting machines, a means for balancing the weight of the planting device upon the axle and main carrying wheels, and to remove the weight borne upon the horses' necks, when planters are turned at ends of rows and in traveling, when not planting, and placing it upon the axle of the planter.

Third, to provide an improved means of lifting and carrying the planting device of corn and other seed planting machines, clear of the ground in turning at ends of rows or in traveling upon the road and of lowering the same into the ground as desired when in use.

I attain these objects by the mechanism illustrated in the accompanying drawings, in which—

Similar letters and figures refer to similar parts throughout the several views.

The drawings themselves better illustrate the mechanism and workings of my invention.

Figure 1:
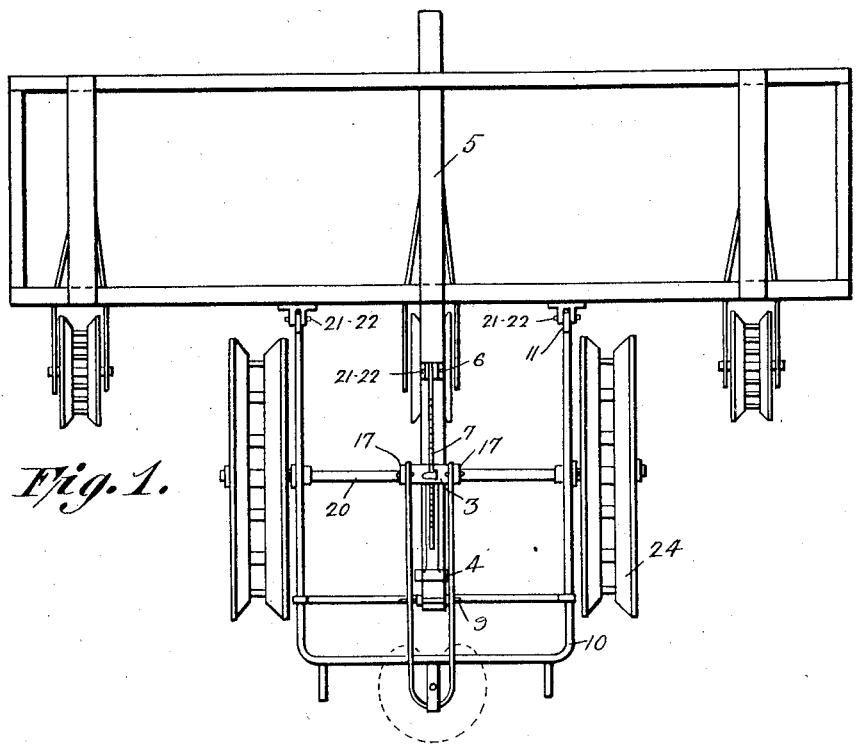
Figure 1 is a plan view of the assembled device attached to a part of a corn planter.
Figure 2:
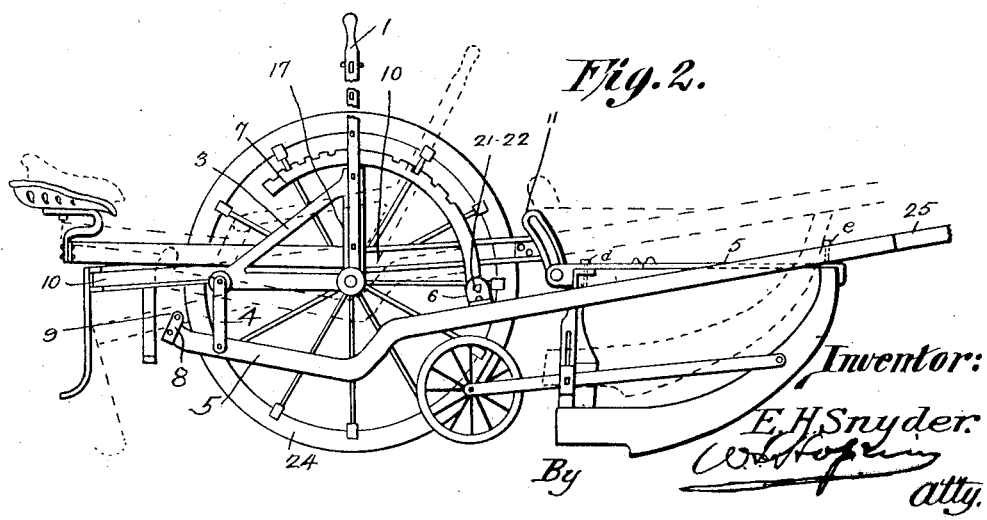
Fig. 2, is a sectional or longitudinal view of the corn planter showing the lifting device in its various attachments and connections, and illustrating its operation, assembled.

The lifting device consists of a handle 1 and latch device mounted in a groove in a triangular iron 3, which triangular iron 3, is mounted upon an axle 20 and is with the axle supported by two carrying wheels 24. The triangular iron 3 is by link means 4 connected with a channel bar 5, known as the tongue bar 5 which is attached to the tongue at 25 and extends backward beneath the axle 20 and has a crook in it immediately under the axle 20 which crook bows downward letting the rear end stick upward when attached, and is of sufficient degree to admit of the crook thus formed, forming a collar under the axle 20 as shown in Fig. 2. This structure allows the rear end of the tongue to be elevated above the horizontal plane of the axle to lift its rear end. A further part of the lifting device is the circular quadrant 7, a flat iron quarter circle device provided with notches at its outer edge to facilitate the fixing and releasing of the handle of the lift 1 by latch means 2, at given points in raising and lowering the seed box frame and attachments and devices of the lifting device, which quadrant is attached by eye stand means 21 secured by pin 6 to the tongue bar, in front of axle, between the seed box frame and the first bend of the crook. A further part of the lifting device is the slot or loop attachments 11, of strap iron secured at their inner sides by extensions to the front ends or prongs of the U shaped carrying frame 10 by bolt means and by the use of which slot or loop attachments the seed frame is permitted to move forward and backward, upward and downward when responding to the lever, in motion corresponding to the motion of the tongue. The runner frame is pivoted to the wheel supported frame by the slotted head 11, the pivots 21 and 22 passing through said head and thus holding the runner frame in operative relationship to the frame 10.

A further part of the lifting device is a roller 9 operating in an eye stand attached to the rear end of the tongue by bolt means, which roller is of a length sufficient to support both bars of the U shaped strap iron balancing lever and operating therewith when the tongue bar is elevated, supporting the same.

A further part of the lifting device is the U shaped strap iron balancing lever which is pivoted to axle 20 at 17 supporting the seat at its rear end.

I claim:

1. In an implement frame, a wheel supported frame, a runner frame pivoted thereto, an axle, a tongue so positioned as to raise the runner frame by its upward movement, having a portion thereof bent downwardly and then upwardly, said portion being directly beneath said axle, means for raising the rear end of said tongue, a seat to the rear of said axle and pivotally related thereto, the rear end of said tongue being operably related to said seat in such manner as to raise the seat when the rear end of said tongue is raised.

2. In an implement frame including a wheel supported frame, a supporting axle, a tongue being formed with a downwardly extending practically U-shaped portion at a point directly beneath said axle, means for raising and lowering the rear end of said tongue, a substantially U-shaped member pivotally related to said axle and lying approximately in a horizontal plane, a seat carried by the rear end of said member, a roller carried by the rear end of said tongue and adapted to engage said U-shaped member and raise the rear end thereof when the rear end of said tongue is raised and means connecting the wheel supported frame and the tongue for raising the latter.

3. In a seed planter, a wheel supporting frame, a runner frame pivoted at the forward end thereof, a tongue secured to the runner frame and extending beneath the wheel supported frame, an independent seat supporting frame pivoted to the axle of the wheel supported frame and located transversely within the wheel supported frame and extending rearwardly thereof and located above and in the path of means carried by the rear end of the tongue for raising the seat when the rear end of the tongue is raised, connecting means between the wheel supported frame and the rear extension of the tongue for raising the runner frame.

All substantially as set forth.

EMMANUELL HENRY SNYDER.

Witnesses:
HAROLD METCALF,
ISAAC H. JOSEPH.